United States Patent
Cohen et al.

(10) Patent No.: US 6,840,135 B1
(45) Date of Patent: Jan. 11, 2005

(54) SAFETY HANDLEBAR

(75) Inventors: Jeremy Mark Cohen, Baltimore, MD (US); Luis Otoya, Manassas, VA (US); Kristy Bittenbender Arbogast, Media, PA (US); Flaura Koplin Winston, Narberth, PA (US)

(73) Assignee: The Children's Hospital of Philadelphia, Philadelphia, PA (US)

( * ) Notice: Subject to any disclaimer, the term of this patent is extended or adjusted under 35 U.S.C. 154(b) by 0 days.

(21) Appl. No.: 09/675,743

(22) Filed: Sep. 29, 2000

Related U.S. Application Data

(60) Provisional application No. 60/156,758, filed on Sep. 29, 1999.

(51) Int. Cl.[7] ................................................. B62K 21/26
(52) U.S. Cl. ..................................... 74/551.9; 74/558.5
(58) Field of Search .............................. 74/551.1, 551.2, 74/551.8, 551.9, 519, 523, 558.5; 16/421, 422

(56) References Cited

U.S. PATENT DOCUMENTS

| | | |
|---|---|---|
| 593,222 A | 11/1897 | Humphrey |
| 599,793 A | 3/1898 | Pihl |
| 627,227 A | 6/1899 | Fenton |
| 778,573 A | 12/1904 | Dunsford |
| 864,056 A | 8/1907 | Altenburger |
| 1,303,803 A | 5/1919 | Kennedy |
| 1,568,911 A | 1/1926 | O'Brien |
| 2,456,267 A | 12/1948 | Gazda |
| 2,462,381 A | 2/1949 | Gazda |
| 3,804,446 A | * 4/1974 | Warrener .................... 293/88 |
| 4,461,057 A | 7/1984 | Unger |
| 4,799,668 A | 1/1989 | Jansen |
| 4,875,142 A | 10/1989 | Spector |
| 5,236,170 A | * 8/1993 | Johnsen .................... 248/578 |
| 5,934,154 A | * 8/1999 | Noel ......................... 74/551.9 |
| 6,029,315 A | 2/2000 | Flower |
| 6,367,125 B1 | 4/2002 | Lin |
| 2003/0217615 A1 | 11/2003 | Menon et al. |

OTHER PUBLICATIONS

U.S. patent application Ser. No. 10/157,401, Cohen et al.
Winston, *Pediatrics*, vol. 102, No. 3, "Hidden Spears: Handlebars as Injury Hazards to Children," (Sep. 1998).

* cited by examiner

*Primary Examiner*—David A. Bucci
*Assistant Examiner*—Vicky A. Johnson
(74) *Attorney, Agent, or Firm*—Caesar, Rivise, Bernstein, Cohen & Pokotilow, Ltd.

(57) ABSTRACT

A safety handlebar is described in which telescopic handgrips are provided at the two opposing outer ends of the tubular frame of the handlebar. In each embodiment described, a shaft and an outer cover are locked together for telescopic movement on each tubular outer end of the handlebar frame. A bias member in the form of a coil spring biases the grip portion outward away from the tubular ends of the frame. A dampening mechanism is provided to retard the return of the grips to their original position after they have telescoped inward after impacting with the user. A hydraulic dampening system employing grease and an pneumatic system employing air are described.

16 Claims, 4 Drawing Sheets

SAFETY HANDLEBAR

This application claims the benefit of provisional application No. 60/156,758, filed Sep. 29, 1999.

BACKGROUND OF THE INVENTION

Impact with a handlebar in slow speed bicycling crashes has been identified as a mechanism for causing life threatening truncal injuries in children. Severe abdominal injury is seldom immediately evident following bicycle trauma related accidents. A consequential injury that may result from such a handlebar accident is a traumatic abdominal wall hernia (TAWH). A TAWH is produced by a direct blow that is either blunt or may impact the skin with an insufficient force to puncture the skin. A TAWH occurs because the elasticity of the skin is greater than the other layers of the abdominal wall. The skin remains intact despite the fact that there may be significant disruption below the abdominal wall, i.e. muscle and fascia, thus causing a difficulty in detection. In the worst case scenario, bicycle handlebar trauma can cause death. Bicycle handlebar trauma is often hard to detect initially in a clinical atmosphere and may be further complicated by delayed injury.

In recent years, an increasing number of children have suffered severe abdominal trauma while riding their bicycles. Since this mechanism of injury has not been well described and abdominal trauma is difficult to detect without a thorough examination, many children are sent home and forced to return to the hospital when the symptoms become more severe. One particular form of accident is responsible for the majority of these injuries. This involves a rapid shift in momentum caused by the front tire of the bicycle coming into contact with a changing interface such as the transition from sidewalk to grass. This transition stops the bicycle and tends to rotate the front wheel and handlebars. The rider continues to move forward into an end of the handlebar and often hits the ground with the handlebar end still in contact with his/her abdomen. On impact, an additional blow is exerted by the handlebar on the rider, which is translated into the rider's abdominal area.

It would be beneficial to develop a handlebar which absorbs at least some of the energy generated by the impact of the rider with the handlebar, thereby reducing the amount of force transmitted to the rider as a result of the impact.

BRIEF SUMMARY OF THE INVENTION

A safety handlebar comprising a frame having opposing, tubular outer ends, a shaft having first and second shaft ends, the first shaft end slidably being connected with one of the tubular out ends; a bias member operatively associated with the shaft and the frame so as to bias the second shaft end away from the frame; and a dampener operatively associated with the first shaft end and the frame so as to dampen displacement of the second end of the shaft away from the frame.

A child-safe handlebar comprising a generally tubular frame having a tubular outer end; a shaft having opposing first and second ends, the first shaft end being slidably telescoped with the fame outer end; and a fluid dampener operatively associated with the frame and the shaft at the outer end to slow movement of the shaft out of the outer end.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 3:
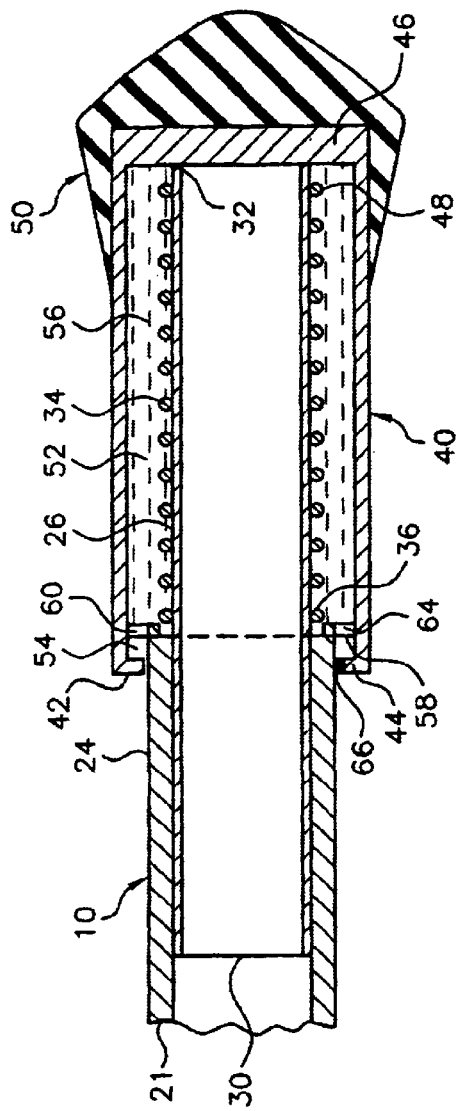
FIG. 3 is a cross-sectional view of an end of the handlebar in an uncompressed condition according to a first embodiment of the present invention.
Figure 4:
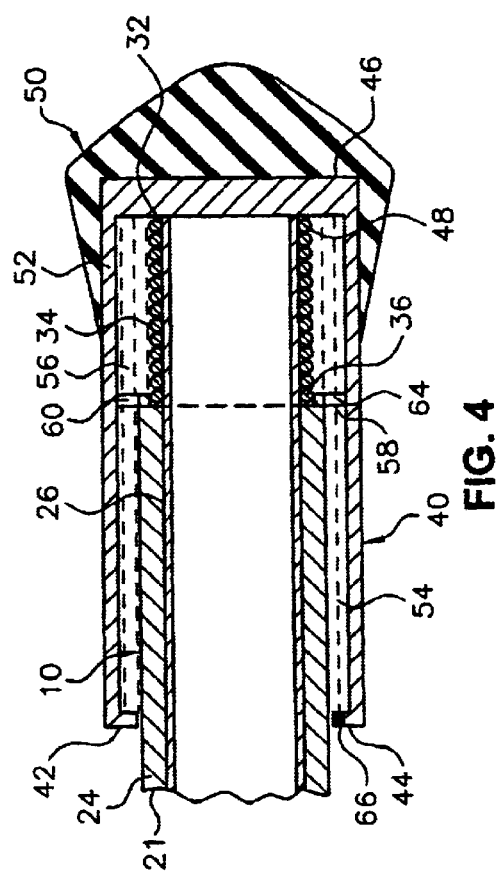
FIG. 4 is a cross-sectional view of the end of the handlebar in a compressed condition according to a first embodiment of the present invention.
Figure 5:
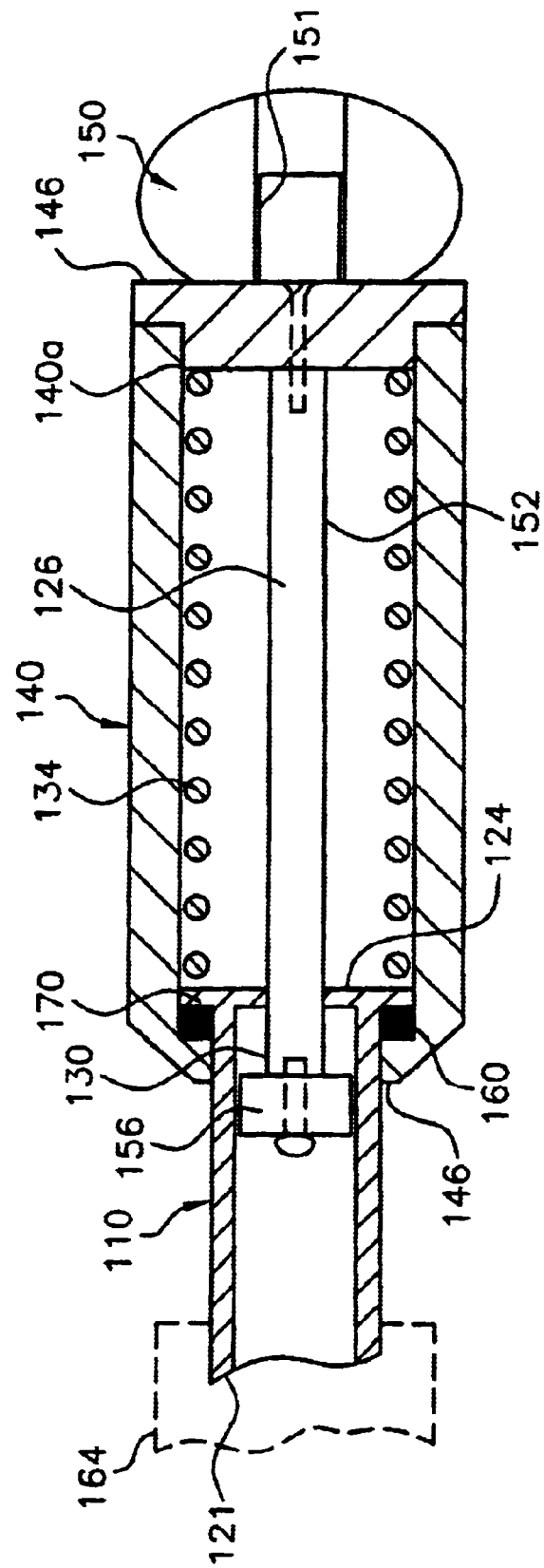
FIG. 5 is a cross-sectional view of an end of the handlebar in an uncompressed condition according to a second embodiment of the present invention.

Certain terminology is used in the following description for convenience only and is not limiting. The words "lower" and "upper" designate directions in the drawings to which reference is made. The words "inwardly" and "outwardly" refer to directions toward and away from, respectively, the geometric center of the handlebar and designated parts thereof. The words "inboard" and "outboard" refer to sides of elements proximate to and distal from, respectively, the geometric center of the handlebar and designated parts thereof. In FIGS. 3, 4 and 5, "inboard" refers to a direction toward the left-hand side of the figures, and "outboard" refers to a direction toward the right-hand side of the figures. The words "left" and "right", as used herein, correspond to sides of the handlebar as viewed by a rider on a bicycle. The word "a" is defined to mean "at least one". The terminology includes the words above specifically mentioned, derivatives thereof and words of similar import. In the drawings, like numerals are used to indicate like elements throughout.

Figure 1:
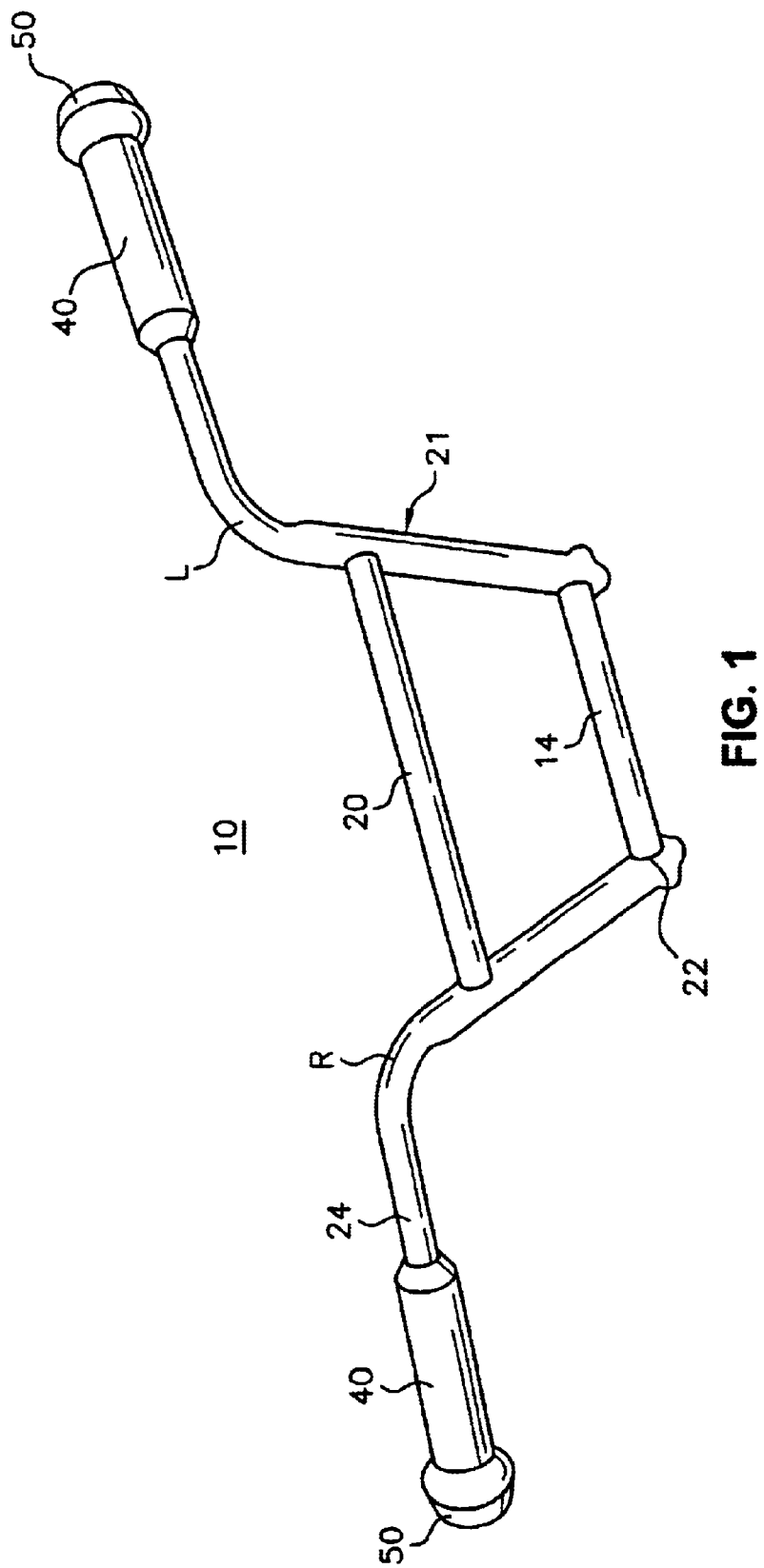
FIG. 1 is a front view of a handlebar in accordance with the present invention.
Figure 2:
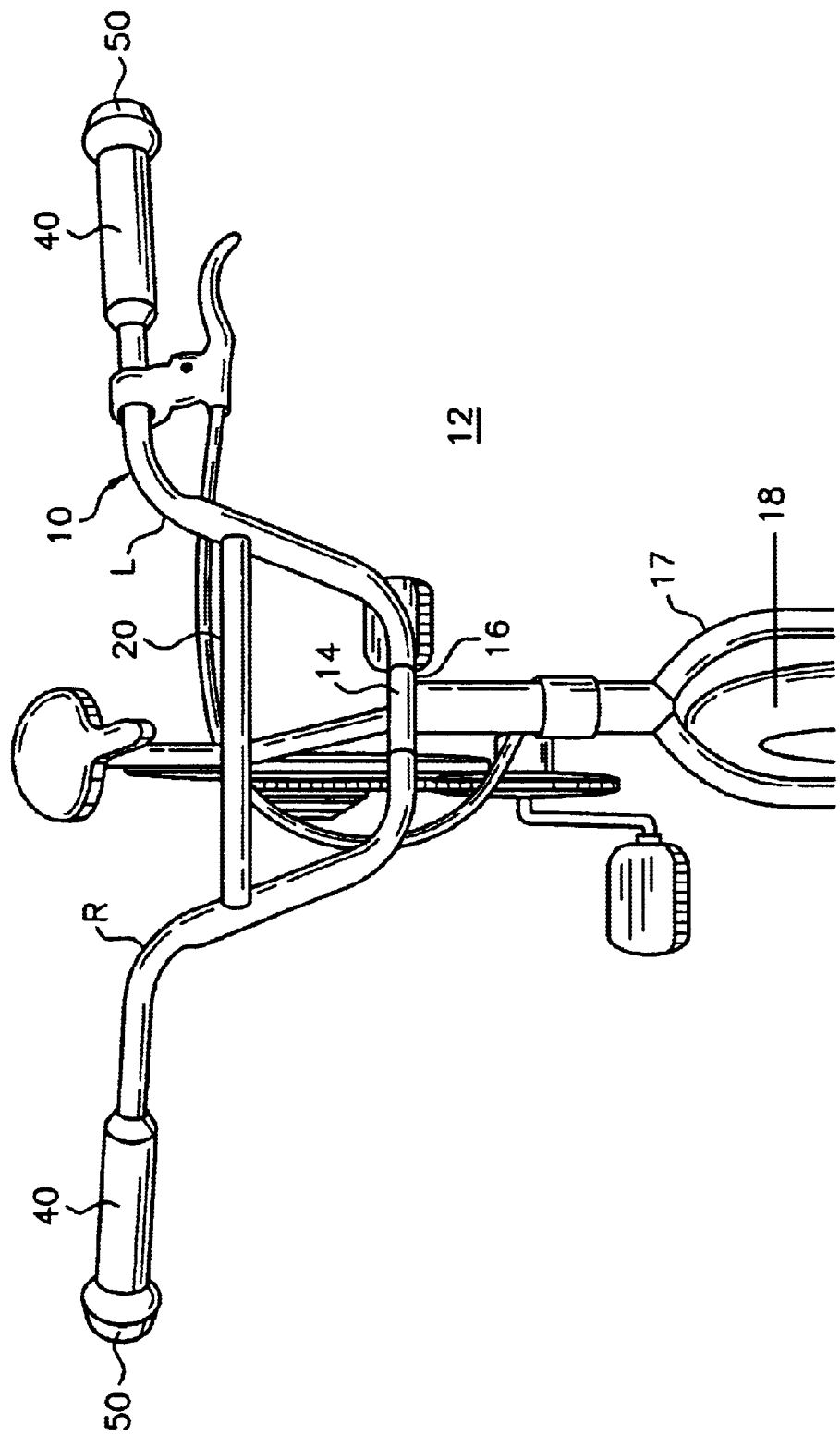
FIG. 2 is a front view of the handlebar mounted onto a bicycle.

Referring now to FIGS. 1 and 2, the present invention is a child-safe handlebar 10 for use on a BMX style bicycle 12. Although the handlebar 10 will be discussed in relation to its use on a BMX bicycle, those skilled in the art will realize the present invention can also be used with handle bars of other styles for other types of bicycles, including but not limited to a single, continuous bent tube, and other forms of personal transportation and toys that are pushed or ridden.

The handlebar 10 is provided by a generally tubular frame 21, which includes at least left and right tubular sides L and R, respectively, which extend from a generally horizontal connector bar 14. The connector bar 14 is connected to a generally vertical pivot post or "stem" 16 on the bicycle 12, which defines an axis about which the handlebar 10 rotates. The pivot post 16 is connected to the fork 17 supporting a front wheel 18 on the bicycle 12 such that, when a rider (not shown) turns the handlebar 10 and rotates the pivot post 16, the front wheel 18 turns with the handlebar 10, allowing the rider to steer the bicycle 12. The BMX style handlebar 10 can further include a stabilizer bar 20 which connects the left and right tubular sides L, R together at a location above the connector bar 14. The stabilizer bar 20 can be padded (not shown) as is well known in the art. The stabilizer bar 20 is not part of the present invention and will not be further described herein.

The left and right tubular sides or arms L, R of the handlebar 10 are preferably mirror images of each other, and only the right side R of the handlebar 10 will be described, although the present description will pertain to the left side L of the handlebar 10 as well. The handlebar frame 21 is preferably constructed to steel, although those skilled in the art will realize that the handlebar frame 21 can be other materials and cross-sectional shapes as well.

A first, inboard end 22 of the right tubular side R of the handlebar frame 21 is fixedly attached to the connector bar 14. An outboard or distal end 24 of the right side R of the handlebar frame 21 is tubular and extends away from the connector bar 14, generally at an elevated angle and generally toward the rear of the bicycle 12, as shown in FIG. 2 and also forms an outer or distal end of the frame 21.

As shown in cross-section in FIGS. 3 and 4, a tubular shaft 26 is telescopically coupled with, preferably received in and extending outwardly from, the outer end 24 of the handlebar frame 21, The shaft 26 includes a first inner end 30, which is generally slidably disposed within the outer end 24 of the handlebar frame 21. Shaft 26 is thus slidably connected with the frame 21 The shaft 26 also includes a second outer or distal end 32 which generally extends outwardly from the outer end 24 of the handlebar frame 21. Preferably, when in an uncompressed state, the shaft 26 extends outwardly from the outer end 24 of the handlebar frame 21 approximately three and a half (3½) inches, although those skilled in the art will realize that the shaft 26 can extend more or less than three and a half inches from the outer end 24 of the arm R of frame 21 as desired or necessary.

A biasing member, preferably in the form of a helical spring 34, is operatively associated with the shaft 26 and the frame 21 so as to bias the second outer shaft end 32 away from the outer end 24 of the frame 21. Preferably, spring 34 coils around the exterior of the shaft 26 such that a first, inboard end 36 of the spring 34 engages the second end 24 of the handlebar frame 21. The spring 34 is normally in an uncompressed state, although those skilled in the art will realize that the spring 34 can be at least partially compressed in a normal state. The shaft 26 generally serves as a support for the spring 34. Preferably, a spring 34 with a k value of 10 lb/in is used, although those skilled in the art will realize that springs with other k values can be used. Also, preferably, the spring 34 is approximately three (3) inches long when in an uncompressed state, although those skilled in the art will realize that the spring 34 can be longer or shorter than three inches when in an uncompressed state.

A cover 40 extends over the spring 34 and the portion of the shaft 26 which is located outboard of the outer end 24 of the handlebar frame 21, as well as a portion of the outer end 24. The cover 40 preferably is slidably disposable over the outer end 24 of the handlebar frame 21 as will be discussed in more detail herein. A first, inboard end 42 of the cover 40 includes an annular wall 44 which is slidable along the exterior of the second end 24 of the handlebar frame 21.

A second, outboard end 46 of the cover 40, distal from the handlebar frame 21, is preferably closed and is fixedly connected to the second end 32 of the shaft 26. A second end 48 of the spring 34 engages the second end 46 of the cover 40, (or of the shaft) biasing the second end 32 of the shaft 26 away from the second end 24 of the handlebar frame 21. The second end 46 of the cover 40 also includes a compressible cap 50 extending outwardly therefrom. Preferably, the cap 50 is constructed of rubber or foam, although those skilled in the art will realize that any compressible material can be used. The cap 50 provides a soft, cushioned surface to distribute an impact force more evenly to the closed end 46 of the cover 40.

Handlebar 10 further includes a dampener operatively associated with at least one of the shaft and the frame so as to slow displacement of the second end of the shaft away from the frame outer end 24. Preferably, the cover 40 encloses first and second generally annular chambers 52, 54, respectively, which are in fluid contact with each other and defined by the cover 40, outer end 25 and shaft 26. A dampening fluid, preferably a dampening grease 56, is provided in the first chamber 52, surrounding the spring 34. Preferably, the dampening grease 56 has a dynamic viscosity of between about 60 and 130 and, more particularly, between 65 and 128.5 N/s-m². (Dynamic viscosity of a fluid is equal to kinematic viscosity times density of the fluid.) NyoGel 774VL, manufactured by Nye Lubricants in Hockessin, Delaware, which falls within the preferred range, has been used as the dampening grease 56, although those skilled in the art will realize that other lubricants, including other greases or fluids, can be used. The dampening grease 56 provides a dampening effect similar to the hydraulic oil used in automobile shock absorbers. The first chamber 52 is separated from a second chamber 54 by a generally annular wall 58 which extends radially outwardly from the second end 24 of the handlebar frame 21 but is slidably engaged with the interior of the cover 40. Two or more one-way valves 60, 64 are provided. Preferably, first one-way valve 60 with a relatively larger opening allows the dampening grease 56 to be transferred from the first chamber 52 to the second chamber 54. Preferably, second one-way valve 64 with a relatively smaller opening allows the dampening grease 56 to be transferred from the second chamber 54 to the first chamber 52 more slowly than the transfer of the grease 56 through first valve 60. Preferably, the second chamber 54 is also filled with dampening grease 56 to avoid forming any air pockets that could adversely affect the operation of the dampening system. Although larger and smaller individual valves are described, it will be appreciated that greater numbers of smaller valves can be provided to pass dampening grease from the first to the second chambers. Valves 60, 64 can be of any construction. Flap or slit valves are suggested.

An O-ring 66 or other seal known to those skilled in the art preferably is fixedly attached to the annular wall 44 at an interface between the annular wall 44 and the second end 24 of the handlebar frame 21 to prevent dampening grease 56 from leaking out of the second chamber 54 and onto the outer surface of the handlebar frame 21.

Normally, the spring 34 is in an uncompressed state or alternately, in a partially compressed state, as shown in FIG. 3. When the bicycle 12 encounters an obstacle (not shown) that causes the bicycle 12 to suddenly stop, the front wheel 18 of the bicycle 12 tends to turn and the rider is thrown into one of the two distal ends of the handlebar 10 rotated with the wheel 18 toward the rider (e.g., the outer end 24 of the frame 21). The rider's body contacts the cap 50 and the second end 46 of the cover 40, forcing the shaft 26 into the handlebar frame 21, generally with an axial impacting force. The rider can additionally fall on that handlebar end if the rider and bike continue to fall over together. The cap 50 compresses and slows and distributes the impact force throughout the second end 46 of the cover 40. The cover 40 and the shaft 26 then axially translate inward along the outer end 24 of the handlebar frame 21 (to the left in FIGS. 3 and 4) at a rate and distance which is proportional to the magnitude of the impact force. The second end 48 of the spring 34 is compressed toward the first end 36 of the spring. The spring 34 resists the impact force and gradually slows down the rider as the rider compresses the spring 34, absorbing a portion of the energy of impact.

As the cover 40 is inwardly translated, the first chamber 52 is compressed and the second chamber 54 is expanded, forcing the dampening grease 56 from the first chamber 52, through the first one-way valve 60, and into the second chamber 54. The second one-way valve 64 is closed at this time. Due to the relatively large size of the first one-way valve 60, the transfer of the dampening grease 56 from the first chamber 52 to the second chamber 54 does not significantly affect the compression rate or distance of the spring 34.

Upon compression, the spring 34 stores a portion of the energy of impact. This energy is released upon release of the force from the second end 46 of the cover 40. The energy stored in the spring 34 during compression acts to extend the spring 34 toward its initial, preferably uncompressed condition and return the shaft 26 and cover 40 to their initial positions. As the spring 34 expands, the second chamber 54 is compressed and the first chamber 52 is expanded, forcing the dampening grease 56 through the second one-way valve 64. The first one-way valve 60 is closed at this time. However, since the second one-way valve 64 is relatively small compared to the first one-way valve 60, the dampening grease 56 does not flow as swiftly from the second chamber 54 into the first chamber 52 as the dampening grease 56 flowed from the first chamber 52 into the second chamber 54, thus dampening the return speed of the spring 34 and preventing the second end 46 of the cover 40 from springing back into the rider and causing additional harm to the rider.

In a second embodiment handlebar 110, one outer end 124 of which is shown in cross-section in FIG. 5, the dampening grease 56 and first and second valves 60, 64 are eliminated and an air flow dampener is employed, preferably a feather washer 156. Feather washer 156 is a generally resilient or elastic cup-shaped member with a feathered outer edge and is used in hydraulic and/or pneumatic systems as a combined valve and seal. The feather washer 156 is preferably located on the first (inner) end 130 of a shaft 126, which is slidably received in the tubular distal or outer end 124 of handlebar frame 121, as shown in FIG. 5. The use of a feather washer 156 in a tube should be well known to those skilled in the art. The washer 156 is oriented to allow air to easily pass by the outside of the washer 156 when the feather washer 156 and the shaft 126 are forced inwardly (during compression), but to "flap out" as air is attempts to pass by the feather washer 156 when the compressed spring 134 moves the cover 140 and washer 156 outwardly from outer end 124 (during spring expansion). Another seal 160 is preferably provided around the distal end 124 of frame 121 to form a seal for chamber 152 within cover 140. This chamber 152 reduces in volume as the distal end 146 of cover 140 moves inward over the distal end 124 of handlebar frame 121. Seal 160 is at least partially retained in position by a generally radially outwardly projecting wall 170 over which an inner cylindrical surface of cover 140 slides as it telescopes on frame end 124. Chamber 152 is defined by the line surface of cover 140, seal 160 and wall 170.

The second embodiment shows an alternative compressible cap 150 to the cap 50 of the first embodiment. The alternative cap 150 is preferably a foam ball which is mounted to the exterior of the outer or distal end 146 of the cover 140 by being slipped over and adhered to a stem 151. The foam ball constituting cap 150 provides a larger surface area of an elastic material which is exposed to the rider on impact. However, those skilled in the art will realize that either cap 50, 150 or any similar resilient or elastic endpiece can be used in either the first or second embodiments, or the endpiece can be of the known type and need not be elastic. They would also realize that stem 151 could be eliminated and the cap 150 held to the outer end 146 of cover 140 by a fastener through the ball and into the end of cover 140.

In operation, when struck by the rider, the shaft 126 and the cover 140 are inwardly translated along the outer or distal end 124 of the handlebar and the spring 134 is compressed as a result of the impact force upon the outer or distal end 146 of the cover 140, air in the chamber 152 passes by the feather washer 156 and into the frame 121 without significantly affecting the compression rate of the spring 134.

After the impact force is released from the second (outer) end 146 of the cover 140, the spring 134 expands, forcing the shaft 126 back toward its pre-impact position. However, the feather washer 156 "flaps out", creating resistance to air flow within the shaft 126 and the handlebar frame 121, slowing down the return speed of the spring 134 and the shaft 126, and preventing the outer or distal end 146 of the cover 140 from springing back into the rider and causing additional harm to the rider.

FIG. 5 shows the outer or distal end 146 of the cover 140 being a separate piece screw threaded into a threaded end of a cylindrical portion 140a of the cover 140. This feature, as are several other features shown, is for assembly purposes only and those skilled in the art will realize that other methods of connecting the second end 146 of the cover 140 to the second end 124 of handlebar 110. For example, the second frame end 124 might be provided by a separate tubular member which is coupled by a threaded or compression collar 164 (in phantom) or otherwise fixedly joined to the distal end of the left and right arms L, R, for example, by fasteners or welds (not depicted).

Use of the handlebar 10, 110 results in approximately a 50% reduction of impact force transmitted to a rider as compared to a standard bicycle handlebar in collisions described above.

Although two preferred methods of dampening the return action of the handlebar 10, 110 are shown, those skilled in the art will realize that other methods of dampening can be used without departing from the spirit and scope of the present invention.

Applicants' provisional patent application Ser. No. 60/156,758 is incorporated by reference herein in its entirety including all appendices.

It will be appreciated by those skilled in the art that changes could be made to the embodiments described above without departing from the broad inventive concept thereof it is understood, therefore, that this invention is not limited to the particular embodiments disclosed, but it is intended to cover modifications within the spirit and scope of the present invention as defined by the appended claims.

What is claimed is:

1. A safety handlebar comprising:
   a frame having opposing, tubular outer ends;
   a shaft having first and second shaft ends, the first shaft end being slidably connected with one of the tubular outer ends;
   a bias member operatively associated with the shaft and the frame so as to bias the second shaft end away from the one tubular outer end of the frame; and
   a dampener operatively associated with the shaft, the frame and the bias member, said dampener being adapted to dampen displacement of the second shaft end away from the one tubular out end of the frame in response to compression of the bias member from a pre-impact position to a compressed position by an impact force with said frame, such that after the impact force is released, said dampener slows a return speed of said bias member from the compressed position to the pre-impact position for preventing the second shaft end from springing back to a second shaft end pre-impact position at an undampened return speed, wherein the dampener is further adapted to dampen expansion of the bias member from the compressed position to the pre-impact position more than compression of the bias member from the pre-impact position to the compressed position.

2. The handlebar according to claim 1, wherein the bias member is a helical spring.

3. The handlebar according to claim 1, further comprising a compressible cap coupled with the second shaft end for movement with the second shaft end.

4. The handlebar according to claim 1 further comprising a cover coupled with the shaft to slidably telescope on the one outer end of the frame.

5. The handlebar of claim 1 wherein the dampener comprises:

a first chamber associated with the second shaft end;

a second chamber associated with the first shaft end;

a dampening fluid contained within at least one of the first and second chambers;

a first one-way valve fluidly connecting the first chamber to the second chamber so as to allow the dampening fluid to flow only from the first chamber to the second chamber; and a second one-way valve fluidly connecting the second chamber to the first chamber so as to allow the dampening fluid to flow only from the second chamber to the first chamber, the second one-way valve having a second opening smaller than a first opening in the first one-way valve.

6. The handlebar according to claim 5, further comprising a cover extending over the shaft between the second shaft end and the one outer end of the handlebar frame, a first end of the cover being slidably disposed over the outer end of the frame and a second end of the cover being fixedly coupled with the second end of the shaft so as to telescope with the shaft along the one outer end of he handlebar frame; and a generally annular wall extending radially outwardly from the outer frame end, a radial end of the wall being slidably disposed against the cover.

7. The handlebar according to claim 6, wherein the first chamber is defined at least in part by the annular wall, the cover, and the shaft.

8. The handlebar according to claim 6, wherein the second chamber is defined at least in part by the annular wall, the cover, and the frame.

9. The handlebar according to claim 5, wherein the dampening fluid is a dampening grease.

10. The handlebar according to claim 5, wherein the bias member is a helical spring.

11. The handlebar according to claim 5, further comprising a compressible cap affixed with the second shaft end.

12. A child-safe handlebar comprising:

a generally tubular frame having a tubular outer end;

a shaft having opposing first and second shaft ends, the first shaft end being slidably telescoped with the tubular outer end;

a bias member operatively associated with the shaft and the frame so as to bias the second shaft end away from the tubular outer end; and a fluid dampener operatively associated with the frame, the shaft and the bias member, said dampener being adapted to dampen displacement of the second shaft end away from the tubular outer end in response to compression of the bias member from a pre-impact position to a compressed position by an impact force with said frame, such that after the impact force is released, said dampener slows a return speed of said bias member from the compressed position to the pre-impact position for preventing the second shaft end from springing back to a second shaft end pre-impact position at an undampered return speed, wherein the dampener is further adapted to dampen expansion of the bias member from the compressed position to the pre-impact position more than compression of the bias member from the pre-impact position to the compressed position.

13. The handlebar of claim 12 wherein the dampener comprises:

an air flow damper operatively connected to the first shaft end such that the air flow damper is in a first non-fluid flow obstructing orientation when the second shaft end is displaced toward the frame, and the air flow damper is in a second, fluid flow obstructing position when the biasing member displaces the second shaft end away from the frame to slow displacement of the second shaft end away from the frame.

14. The handlebar of claim 12 further comprising:

a biasing member coupled between the shaft and the frame so as to absorb energy as the shaft slide into the outer end of the frame.

15. The handlebar of claim 12 wherein the dampener comprises:

a first chamber associated with the second shaft end; and a dampening fluid contained with the first chamber.

16. The handlebar of claim 15 further comprising a second chamber associated with the first shaft end and at least one valve fluidly coupling the first and second chambers.

* * * * *